C. W. BISHOP.
SHOCK ABSORBER.
APPLICATION FILED MAY 21, 1921.
1,425,831. Patented Aug. 15, 1922.
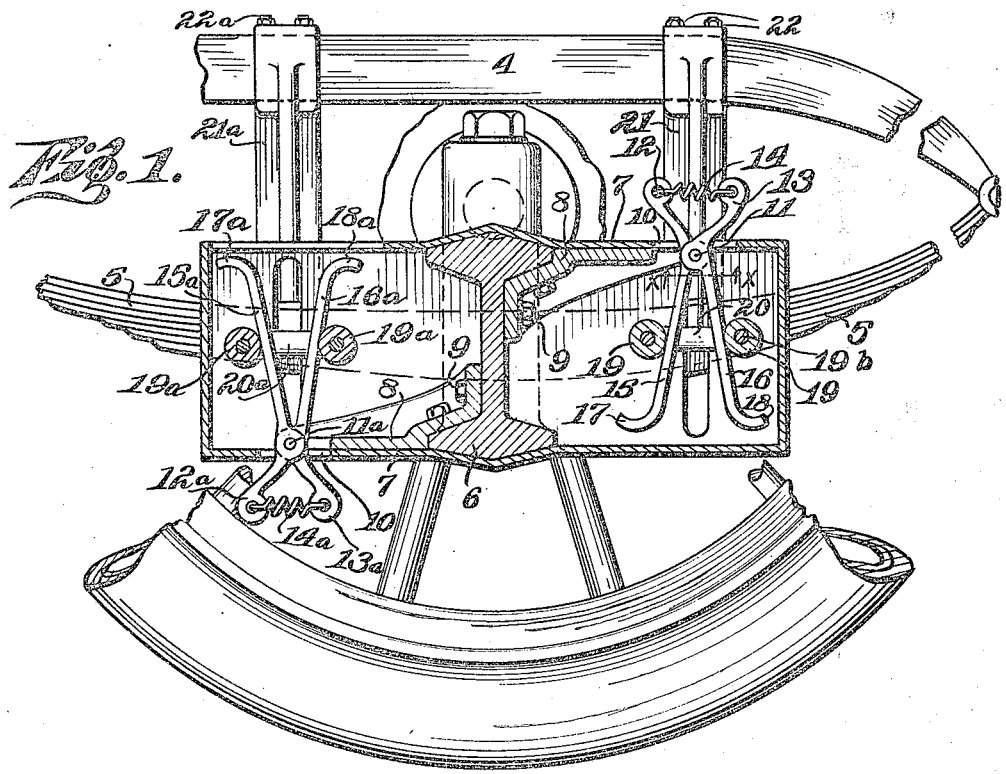
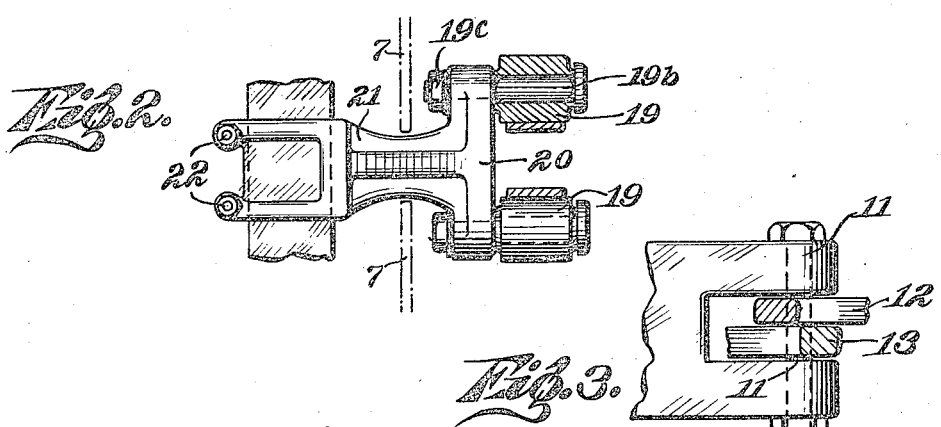
Charles William Bishop, INVENTOR.

UNITED STATES PATENT OFFICE.

CHARLES WILLIAM BISHOP, OF LOS ANGELES, CALIFORNIA.

SHOCK ABSORBER.

1,425,831.  Specification of Letters Patent.  Patented Aug. 15, 1922.

Application filed May 21, 1921. Serial No. 471,492.

*To all whom it may concern:*

Be it known that I, CHARLES WILLIAM BISHOP, a citizen of the United States, residing in the city of Los Angeles, county of Los Angeles, and State of California, have invented certain new and useful Improvements in Shock Absorbers, of which the following is a full and clear specification, enabling those skilled in the art to which it appertains to make and use the same.

This invention relates to shock absorbing mechanism, and particularly to shock absorbing mechanism for automotive vehicles.

It is an object of this invention to improve the riding qualities of an automobile or a similar automotive vehicle by reducing to a minmum the unpleasant rebound which is common to the ordinary vehicle, and to accomplish this purpose I provide a double acting shock absorbing mechanism, operative in both directions, preferably in combination with the conventional spring end on said automotive vehicle.

It is well known that when any spring is compressed it will rebound with considerable violence, depending on the degree of compression and the strength of the spring. It has been the object of many to reduce or eliminate this unpleasant rebound and more or less complicated mechanism has been employed to that end.

It is an object of this invention to provide a mechanism operative in both directions, having for its primary object to prevent or reduce to a minimum what may be termed chattering or similarly unpleasant and comparatively unrestricted vibration. With this end in view reference may be had to the accompanying drawings forming part of this specification.

Figure 1 is a side elevation and section of my invention as it might appear applying to an automotive vehicle.

Figure 2 is a plan view of a part of my invention.

Figure 3 is an enlarged view of a part of my invention on the line X—X, Figure 1.

In the various figures, 4 is an automobile frame, 5 is a spring positioned below the frame 4, 6 is an axle substantially attached to the spring 5, and on the axle 6 is mounted a housing 7, supported by brackets 8—8 to the axle 6 by means of bolts 9—9. 10—10 are a plurality of openings through the housing 7 and 11$^a$, respectively, are pins attached to the housing 7 and having fulcrumed thereon a pair of levers 12—15, 13—16, with the spring 14 between the ends 12 and 13, respectively, and with suitable rounded ends to form hooks, substantially as represented by 17 and 18, respectively. 19—19 are a plurality of rollers mounted upon pins 19$^b$, held in place by ends 19$^c$, forming a part thereby with the bracket 20 and 21, which in turn is attached to the frame 4 by means of the bolts 22—22. A similar mechanism is duplicated on the other side of the axle 6 and bears similar figures of reference, with the exception that each figure carries an "a" behind it to distinguish the one part of the instrument from the other. Thus, 22$^a$ are bolts holding a bracket 21$^a$ to a frame 4. 20$^a$ carries a plurality of rollers 19$^a$ and 19$^a$, respectively. Fulcrumed levers 15$^a$ and 16$^a$ are positioned between these rollers and are curved outwardly at their upper ends. In this case, 17$^a$ and 18$^a$, similar to 17 and 18 in the other part of the instrument 12$^a$ and 13$^a$, respectively, are the other ends of the levers 15$^a$—16$^a$ and have a spring 14$^a$ under tension operating to retard movement of the rollers 19$^a$—19$^a$ in one direction while slightly facilitating the action in the other direction.

In the operation of this invention, it will be seen that one part of the instrument operates when the axle moves up and the other part of the instrument acts when the axle moves down. This action is nothing more or less than added friction. The object of this added friction being to prevent excessive vibration of the axle 6 and thus to facilitate a more harmonious movement and improve the riding qualities of the vehicle to which it is attached.

I claim—

A shock absorbing mechanism adapted to be interposed between the axle of an automotive vehicle and the frame of said vehicle and to comprise substantially a plurality of cross levers fulcrumed at the crossing point having a spring under tension between the respective levers at one end of the device and a pair of rollers mounted upon pins extending from a bracket and embracing the free ends of said fulcrumed levers, one of said set of fulcrumed levers projecting downwardly, the other unit projecting upwardly, said embracing rollers adapted to reciprocate relative to said fulcrumed levers and to meet opposition in the way of resistance by reason of compressing said levers and expanding a spring under tension, the resistance to compression of said levers being dependent on said spring, all substantially as set forth.

CHARLES WILLIAM BISHOP.